United States Patent [19]

Pears et al.

[11] Patent Number: 5,147,925
[45] Date of Patent: Sep. 15, 1992

[54] PRODUCTION OF POLYURETHANE POLYMERS, THE POLYMERS SO PRODUCED, AND COMPOSITIONS CONTAINING THEM

[75] Inventors: David A. Pears, Grindlaan; Martinus P. J. Heuts, Echt, both of Netherlands

[73] Assignees: Imperial Chemical Industries PLC, London, England; ICI Resins BV, Waalwijk, Netherlands

[21] Appl. No.: 654,976

[22] Filed: Feb. 14, 1991

[30] Foreign Application Priority Data

Feb. 14, 1990 [GB] United Kingdom ................. 9003349
Sep. 20, 1990 [GB] United Kingdom ................. 9020572
Sep. 20, 1990 [GB] United Kingdom ................. 9020573

[51] Int. Cl.$^5$ ............................................. C08G 18/12
[52] U.S. Cl. .................................. 524/589; 524/590; 524/591; 524/839; 524/840; 524/871; 524/874; 525/453; 528/59; 528/229

[58] Field of Search ............... 524/589, 590, 591, 839, 524/840, 871, 874; 525/453; 528/59, 229

[56] References Cited

U.S. PATENT DOCUMENTS 4,555,561 11/1985 Sugimori ............................. 528/26
5,002,998 3/1991 Carey .................................. 525/453

Primary Examiner—Maurice J. Welsh
Assistant Examiner—Rachel Johnson
Attorney, Agent, or Firm—Cushman, Darby & Cushman

[57] ABSTRACT

A polyurethane polymer having desired chain-pendant or in-chain groups Y is prepared by 1) converting terminal isocyanate groups of an isocyanate-terminated polyurethane prepolymer to groups providing carbon- or nitrogen-bound —NH$_2$ and/or —NH— groups, and 2) chain extending modified prepolymer formed in 1) with a compound having at least two enolic carbonyl groups and also having at least one group Y which becomes chain-pendant or in-chain in the chain-extended polymer.

32 Claims, No Drawings

PRODUCTION OF POLYURETHANE POLYMERS, THE POLYMERS SO PRODUCED, AND COMPOSITIONS CONTAINING THEM

The present invention relates to the production of polyurethane polymers bearing desired chain-pendant or in-chain groups, to the polymers so produced and to compositions containing them.

Polyurethane polymers are widely accepted as valuable materials in many applications on account of their excellent properties such as good chemical resistance, abrasion resistance, toughness, adhesion and durability. For example, aqueous coating compositions comprising aqueous polyurethane dispersions are well known for the production of film coatings on various substrates where the film coatings are used for their protective or adhesive properties.

It is known to be useful to modify the properties of polyurethane polymers by incorporating desired chain-pendant or in-chain groups in the polymer molecules. For example, it is known to incorporate chain-pendant carbonyl groups into a polyurethane polymer so that the polymer, when employed in an aqueous coating composition as an aqueous dispersion, will undergo selfcrosslinking during and/or after film formation from the composition, by virtue of reaction with a compound bearing at least two carbonyl-reactive groups, such as a polyamine or a polyhydrazine compound, which is also present in the composition. See, for example EP-A-0332326 (ICI Resins BV).

As is well known, polyurethane polymers are generally made by reacting an organic polyisocyanate(s) with an organic compound(s) containing isocyanate-reactive groups, particularly a macro polyol with the optional inclusion of a low molecular weight organic polyol. A favoured route to their formation involves the formation of an isocyanate-terminated polyurethane prepolymer followed by chain extension with an active hydrogen-containing compound.

It is conventional to incorporate desired groups into a polyurethane polymer by employing as a reactant in the prepolymer formation an isocyanate-reactive compound (normally bearing at least two isocyanate-reactive groups) which also has the desired group(s); in this way the desired groups become included in the prepolymer and thence in the final polyurethane polymer after chain extension.

Such a technique, however, has drawbacks when employing very sensitive functional groups, such as carbonyl groups, as the desired groups for incorporation into the polymer, since there is a danger that premature reaction of the functional groups with the chain-extending species may occur during the chain extension step. For example, unless conditions are very carefully controlled, there is a danger that functional groups such as carbonyl groups will undergo at least some premature crosslinking reaction with conventional chain extending compounds such as hydrazine hydrate, diamines, or triamines.

It has also been proposed to incorporate desired groups into a polyurethane polymer by including as part of the active hydrogen-containing chain extending species an active-hydrogen-containing compound which also has the desired group(s). In this way, the desired groups become incorporated into the polyurethane polymer during the chain-extension step by virtue of reactions analogous with those undergone by conventional active-hydrogen-containing compounds.

The main problem with this approach, however, is that there is a danger that the active hydrogen-containing part of the chain-extender (eg -NH,) will react prematurely with the desired groups one is trying to introduce, particularly where these groups are reactive groups (such as carbonyl groups).

We have now devised an entirely new and useful technique for incorporating desired groups into a polyurethane polymer which does not involve incorporating the desired groups during the prepolymer formation; nor does it involve incorporating the desired groups by a chain-extension reaction involving reaction of conventional active-hydrogen-containing groups with isocyanate groups.

According to the present invention there is provided a process for the production of a polyurethane polymer having desired chain-pendant or in-chain groups (denoted by Y), which process comprises:

1) converting terminal isocyanate groups of an isocyanate-terminated polyurethane prepolymer to groups providing carbon- or nitrogen-bound —NH$_2$ and/or —NH—groups which are reactable with enolic carbonyl groups, thereby to form a modified prepolymer, and 2) chain-extending modified prepolymer formed in 1) with at least one compound which has at least two independently reactable enolic carbonyl groups, which compound also has at least one group Y which becomes chain-pendant or in-chain in the chain-extended polymer, and where by an enolic carbonyl group is meant herein a carbonyl group having enolic character by virtue of being bonded to an alpha methylene or methine group which is itself bonded alpha to an electron withdrawing group.

There is further provided according to the invention a polyurethane polymer having desired chain-pendant or in-chain groups (denoted by Y) which polymer has been prepared by 1) converting terminal isocyanate groups of an isocyanate-terminated polyurethane prepolymer to groups providing carbon or nitrogen bound —NH$_2$, and/or —NH—groups which are reactable with enolic carbonyl groups, thereby to form a modified prepolymer, and 2) chain-extending modified prepolymer formed in 1) with at least one compound which has at least two independently reactable enolic carbonyl groups, which compound also has at least one group Y which becomes chain-pendant or in-chain in the chain-extended polymer.

As mentioned above, by an enolic carbonyl group is meant a carbonyl group (normally a ketonic carbonyl but possibly an aldehydic carbonyl) having enolic character by virtue of being bonded to an alpha (ie adjacent) methylene group (—CH$_2$—) or methine group

with there being an electron withdrawing group which is itself bonded alpha (ie adjacent) to the methylene or methine group, or in other words bonded beta to the carbonyl group. Such a carbonyl group also exists (to a significant degree) in its tautomeric enol structure. The enolising tautomerism may be represented as the following equilibrium

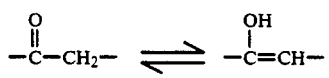

The facile enolisability of the carbonyl group is due to the presence of the electron withdrawing grouping. Typical examples of electron withdrawing groups in enolic carbonyl groups include acid ester groups (the methylene or methine group being bonded to the carbonyl carbon atom of the ester), acid amide groups (the methylene or methine group being bonded to the carbonyl carbon atom of the acid amide), aryl groups (eg phenyl or phenylene groups), and ketonic carbonyl groups.

The electron withdrawing group as a whole may be univalent (ie capping the methylene or methine group) or (as is also quite usual) may be divalent or multivalent (ie being bonded to a further moeity or moeities in the compound). In the case of the enolic carbonyl grouping having a methine group (rather than a methylene group), the remaining bond of this methine carbon atom (the others being attached to H, the carbonyl carbon atom, and the electron withdrawing group) should be attached to a group that does not affect the enolisability of the carbonyl group (eg alkyl or substituted alkyl, alkylene or substituted alkylene, alkanetriyl or substituted alkanetriyl, aryl or substituted aryl). Such a group can be monovalent (eg alkyl), divalent (eg alkylene) or multivalent (eg trivalent eg alkanetriyl).

(For the sake of clarity in nomenclature, we mean by an alkylene group the bivalent radical derived from the removal of any hydrogen atom from an alkyl radical and by an alkanetriyl group the trivalent radical derived from the removal of any hydrogen atom from an alkylene radical. The simplest alkylene radical is therefore methylene —CH$_2$—and the simplest alkanetriyl radical is therefore methine

Examples of suitable enolic groupings (shown in their larger context) are:

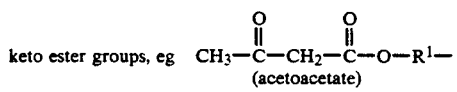

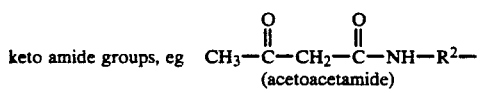

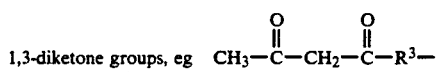

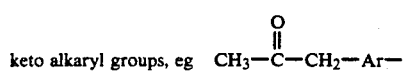

where $R^1$, $R^2$ and $R^3$ are hydrocarbyl radicals (optionally substituted) such as alkylene or alkanetriyl (usually of 1 to 10 carbons and typically methylene) and Ar is an arylene group (optionally substituted) such as ortho or para phenylene. Groups such as these are well known to be readily enolic.

The chain extension reaction in step 2), which may not necessarily involve all of the modified prepolymer (e.g. only a substantial proportion of the modified prepolymer), is thought to proceed largely through attack by —NH$_2$ (or —NH—) groups of modified prepolymer molecules (derived from the terminal isocyanate groups thereof) on the enolic carbonyl groups of the chain-extending compound (defined in 2)) so as to achieve bonding by means of the formation of an enamine structure by elimination of water; this may be represented schematically as follows:

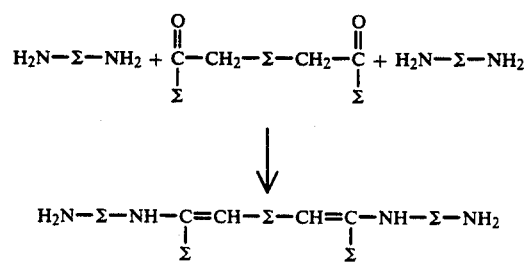

where Σ represents (in each position where it is denoted in the above formulae) the rest of the chemical species to which a particular group under consideration is attached. (The other isocyanate derived —NH$_2$ on each prepolymer molecule will, of course, similarly react). It can be seen that by virtue of the chain-extending compound possessing at least two independently reactable enolisable carbonyl groups, chain extension of prepolymer molecules is effected. While it is believed that the above-described mechanism is the one which operates in the chain extension process, we would not wish to be bound by this belief.

[The symbol Σ will hereinafter, as a matter of convenience, throughout this specification be used to represent the rest of the chemical species to which any particular grouping or atom under specific consideration is bonded].

Since the chain-extending compound used in 2) incorporates at least one desired group Y, the resulting chain-extended polyurethane polymer will bear these desired groups Y.

A group Y may be monovalent as a whole, so that it (in effect) caps the chemical species to which it is attached (Σ—Y), or it may be divalent (or multivalent) so that it is bonded at two or more sites to other chemical species (eg Σ—Y—Σ).

A group Y, depending on its disposition in the chain extending compound, may end up as a chain-pendant (ie lateral) group in the resulting chain-extended polyurethane polymer or as an in-chain group. For example if Y were disposed as shown the following schematic representations:

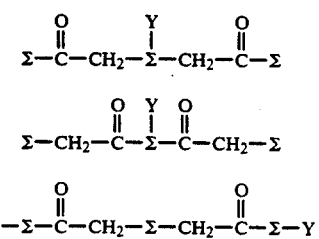

-continued

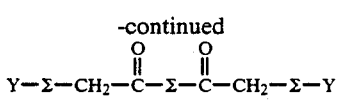

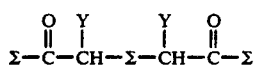

or

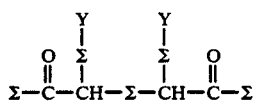

it would end up as a pendant group. (Incidentally, the above representations having two Y groups could of course have only one Y group). If it were disposed as in the following schematic representations:

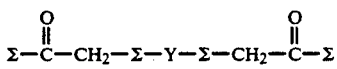

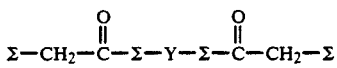

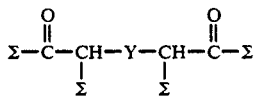

it would end up as an in-chain group in the chain-extended polymer.

It will by now be appreciated that a group Y, could, for example, be a part of (eg a substituent or an in-chain species) or be bonded to (directly or by intermediate species) the electron withdrawing group; or it could be a part of, or could itself be, or could be bonded to, the group attached to the methine carbon atom (in the case where the enolic group has an adjacent methine rather than a methylene group); or it could be a part of, or be bonded (directly or by intermediate species) to the chemical species which is attached to the carbonyl group carbon atom by its other valence bond.

Examples of groups Y include the following:

ketonic or aldehydic carbonyl groups; these could eg be provided by having three or more independently reactable enolic carbonyl groups in the chain-extending compound, so that those not taking part in the chain-extension would end up as lateral carbonyl- containing groups in the chain-extended polymer; an example of this type of chain-extender compound is the triketo ester of formula

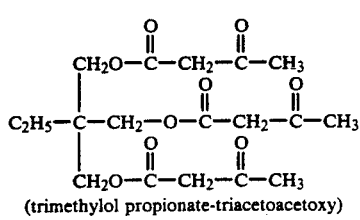
(trimethylol propionate-triacetoacetoxy)

which may be readily prepared from trimethylol propane and diketene;

olefinically unsaturated carbon-carbon bonds; these could eg be incorporated as lateral groups by using a chain-extender compound having at least one (meth)acryloyl or (meth)allyl substituent group (or a substituted derivative thereof); examples of such compounds are

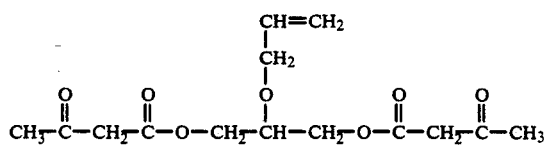

and

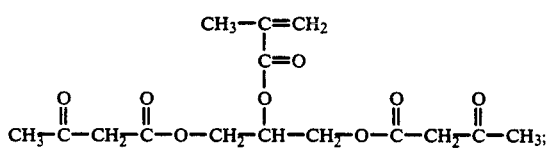

thiol groups such as -SH; an example of a chain-extender compound providing lateral -SH groups is

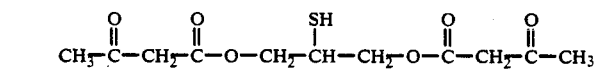

nonionic dispersing groups; these could eg be incorporated as lateral dispersing groups by using a chain extending compound having at least one water-soluble polymer chain, eg a polyethylene oxide chain (typically of 3 to 40 units), as or as part of a substituent on the chain-extender compound; an example of such a compound is

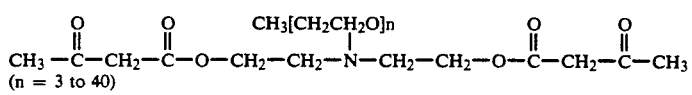

a polymeric chain, such as a polyester chain, a polyether chain, a polycyclic ether (eg THF) chain, a polyamide chain, a polyimide chain or a polycaprolactam chain; these could eg be incorporated as in-chain or lateral groups by using a chain-extender having the following formula

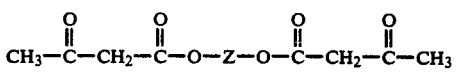

where the chemical species Z is or includes an in-chain or lateral polymeric chain group (such as a polyester chain).

siloxane groups
epoxide groups
phosphonate or phosphate groups (for imparting corrosion resistance)

It is to be understood that Y could be any type of group which imparts desired or improved properties to the polyurethane or the products derived from it (eg coatings), eg an adhesion promoting group, a rheology modifying group, a stabilising group, a corrosion inhibiting group, a block copolymer-forming polymer chain group, or a crosslinking-assisting group (examples of which have been given supra).

In step 1) of the process of the invention, which may not necessarily involve all of the prepolymer molecules (e.g. only a substantial proportion of them), terminal isocyanate groups of the prepolymer may be converted to groups providing the carbon- or nitrogen-bound —NH₂ and/or NH groups by using an appropriate amount of a non-aqueous reagent such as hydrazine (used eg in the form of its hydrate), a substituted hydrazine, a hydrazide compound, or a polyamino compound (eg a diamine or triamine) for substantially effecting this reaction. In the case of using hydrazine hydrate, the relevant reaction involved is the conversion of terminal isocyanate groups of the prepolymer to terminal semi-carbazide groups as follows:

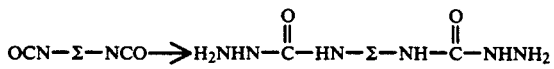

The resulting modified prepolymer can then be chain extended in step 2) using the compound with at least two enolic carbonyls as discussed supra.

In another useful embodiment of the invention, terminal isocyanate groups of the prepolymer are converted directly to —NH₂ groups using water itself as a reagent. In this embodiment, which employs no other isocyanate-reactive reagent to effect step 1) apart from water itself, terminal NCO groups in the prepolymer undergo hydrolysis to form terminal primary amine groups (—NH₂) and chain extension then takes place by reaction of the —NH₂ groups of the modified prepolymer with the enolic carbonyl groups of the chain-extending species having at least two enolic cabonyl groups as discussed supra. We have found that this is the predominant mechanism by which the reaction takes place when using water alone as the isocyanate-reactive reagent in step 1) as a result of nuclear magnetic resonance studies on model compounds. From a practical viewpoint, when using water as an isocyanate-reactive reagent to form —NH₂ groups, step 1) may be simply effected by dispersing an organic liquid medium (ie bulk or with added organic solvent) of the isocyanate-terminated prepolymer into water to form an aqueous dispersion-whereon the hydrolysis of —NCO to —NH₂ groups will take place.

The amount of reagent for introducing —NH₂ or —NH—groups may (if desired) be such as to effect a proportion of chain extension in its own right (since it will of course be appreciated that such reagents are equally effective as chain-extension agents if used in sufficient quantity) as well as providing the desired level of termination required for subsequent functionalisation by chain extension with the enolic carbonyl compound. Generally speaking, the amount of isocyanate-reactive reagent for introducing —NH₂ and/or —NH—groups into the polyurethane prepolymer, except when using water as the sole reagent for this purpose, should preferably be such as to provide a ratio of isocyanate- reactive functional groups (eg the NH₂'s of hydrazine) to isocyanate groups within the range of from 2/1 to 1.05/1, more preferably 1.3/1 to 1.1/1. When using water as a reagent for introducing —NH₂ groups into the polyurethane prepolymer, it is not practicable to speak of such a ratio since the water, functioning as a dispersing medium as well as reagent, will be present in a gross excess relative to the NCO groups of the prepolymer (see supra).

Examples of suitable reagents (apart from water) providing carbon- or nitrogen-bound —NH₂ or —NH—groups in the prepolymer include ethylene diamine, propylene diamine, butylene diamine, hexamethylene diamine, cyclohexylene diamine, piperazine, 2-methyl piperazine, phenylene diamine, tolylene diamine, xylylene diamine, 4.4'-diaminodiphenyl- methane, menthane diamine. m-xylene diamine, isophorone diamine. Also materials such as hydrazine, or hydrazine hydrate, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, hydrazides made by reacting lactones with hydrazine such as gamma-hydroxylbutyric hydrazide, bis-semi-carbazide, and bis-hydrazide carbonic esters of glycols.

In step 2) of the process, the amount of compound bearing enolic carbonyls (and the desired group(s) Y) may often be such as to provide a ratio of carbon- or nitrogen-bound —NH₂ and/or —NH—groups (which are reactable with the enolic carbonyl groups) to enolic carbonyl groups within the range 1/20 to 1/0.01, more preferably ⅓ to 1/0.5 (typically 1/2 to 1/0.5).

It will further be appreciated that in cases where the compound bearing a Y group(s) has three or more enolic carbonyl groups, a certain proportion of chain branching may occur (due to attack by the —NH₂ or —NH—groups of a prepolymer molecule on the polymer-bound enolic carbonyl group(s) of an already chain-extended polymer molecule).

The isocyanate-terminated prepolymer used in step 1) is normally the reaction product of at least:

(i) at least one organic polyisocyanate (ie having at least two isocyanate groups); and (ii) at least one organic compound having at least two isocyanate-reactive groups.

Such a reaction, as is conventional, will be carried out in an organic liquid(s) medium. This could be wholly in bulk, but is more usually in the presence of an organic solvent liquid (used eg to control the viscosity). While the steps 1) and 2) of the process of the invention may (except when using water to convert NCO to NH₂ groups) also be carried out in an organic liquid(s) medium (so as to end up with non-aqueous dispersion of the final polyurethane polymer), it is more preferred that they be carried out in an aqueous medium (ie with the polyurethane prepolymer in each stage present as an aqueous dispersion) so as to end up with an aqueous dispersion of the final polyurethane polymer. (This of course will in any case be an essential pre-requisite when the reagent used for forming —NH₂ groups from NCO groups is water itself.) This is because preferred applications of the polyurethane polymers of the invention involve their use as aqueous dispersions. (For the purposes of this invention an "aqueous dispersion" of a polymer means a dispersion of the polymer in an aqueous medium of which water is the principal component. Minor amounts of organic liquids may optionally be present). Consequently, in the process of the invention it is preferred to provide an aqueous dispersion of the isocyanate-terminated prepolymer prior to converting terminal isocyanate groups thereof to groups providing carbon- or nitrogen -bound —NH₂ and/or —NH—groups which are reactable with enolic carbonyl groups (and in the case of using water as a reagent for converting terminal NCO to NH, groups, this step is in any case essential since water is required as an isocyanate-reactive reagent as well as a dispersing medium).

Consequently a particularly preferred process according to the invention (which is essential when water acts as the isocyanate-reactive reagent) for the production of a polyurethane polymer having desired chain-pendant or in-chain groups (denoted by Y) comprises:

1a) forming an isocyanate-terminated prepolymer in an organic liquid medium, and dispersing the isocyanate-terminated prepolymer in water to form an aqueous dispersion thereof, 1b) converting, in optional conjunction with a proportion of chain extension, terminal isocyanate groups of the prepolymer to groups providing carbon- or nitrogen-based —NH$_2$ and/or —NH— groups which are reactable with enolic carbonyl groups, thereby to form a modified prepolymer; and 2) chain extending modified prepolymer formed in 1b) with at least one compound which has at least two independently reactable enolic carbonyl groups (as defined herein), which compound also has at least one group Y which becomes chain-pendant or in-chain in the chain-extended polymer.

As explained supra, when water is to be used as an isocyanate-reactive reagent to effect stage 1, the stages 1a) and 1b) will in effect be a single stage since dispersion into water and conversion to amino groups takes place without any further addition of isocyanate-reactive reagent. In such a process, the prepolymer may be added into the aqueous phase, or water added into the prepolymer phase, and an appropriate reaction period allowed for hydrolysis to take place. The enolic compound is preferably contained in the aqeuous phase during the disperion. When using a reagent other than water for converting NCO groups, eg a hydrazine or a polyamine compound, such a reagent is used to effect stage 1b) in which (as is well known) it will react much faster with the terminal NCO groups than will water and will provide the predominant reaction in this respect. In such a process the prepolymer may be added into the aqueous phase containing the isocyanate-reactive reagent or water (containing the reagent) may be added to the prepolymer phase and an appropriate period allowed for reaction to take place. The enolic compound may then be added subsequently.

To facilitate such dispersion of the isocyanate-terminated prepolymer in water to form an aqueous dispersion, the prepolymer preferably incorporates ionic and/or non-ionic chain pendant (ie lateral) dispersing groups. This may be achieved by the optional (but preferred) employment in the reaction to form the isocyanate-terminated prepolymer a reactant(s) (iii) which is an isocyanate-reactive and/or diisocyanate compound(s) bearing an ionic and/or non-ionic dispersing group(s) (or a group(s) which may subsequently be converted to such a dispersing group(s)).

The ionic groups may be cationic or anionic, although anionic groups are preferred. Examples of anionic groups are —CO$_2$—(carboxylate salt) and —SO$_3$— (sulphonate salt). An example of a cationic group is

Typically, ionic dispersing groups are anionic salt groups, eg carboxylate salt groups. Such groups may eg be provided by employing as a reactant (iii) in the prepolymer formation an isocyanate-reactive compound having at least one acid group and at least two hydroxyl groups. Examples of such compounds include carboxy group-containing diols and (at low levels) triols, for example dihydroxy alkanoic acids of the formula:

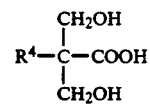

wherein R$^4$ is hydrogen or alkyl. The preferred carboxy containing diol is 2,2-dimethylolpropionic acid. If desired, the carboxy containing diol or triol may be incorporated into a polyester by reaction with a dicarboxylic acid before being incorporated into the prepolymer.

The conversion of any acid groups present in the prepolymer to anionic salt groups may be effected by neutralising the said acidic groups before, after or simultaneously with formation of an aqueous dispersion of the prepolymer.

Suitable agents for neutralizing carboxylic acid groups are the primary, secondary or tertiary amines. Of these the trialkyl-substitued tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylamineoethoxy)-ethanol and 5-diethylamino-2-pentanone. Ammonia itself may also be used.

Non-ionic dispersing groups are typically pendant polyoxyalkylene groups, particularly polyoxyethylene groups. Such groups may eg be provided by employing as a reactant (iii) in the prepolymer formation diols having pendent polyoxyethylene chains such as those described in the prior art (for example in U.S. Pat. No. 3905929). These diols, because of their function, may (for convenience) be termed dispersing diols. Particularly suitable dispersing diols may be obtained by reacting one mole of an organic diisocyanate in which the two isocyanate groups have different reactivities with approximately one mole of a polyethylene glycol mono ether and then reacting and the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have weight average molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°-25° C., optionally in the presence of an inert solvent and a urethane catalyst, followed by addition of the dialkanolamine.

Non-ionic dispersing groups may also be provided by employing as a reactant (iii) in the prepolymer formation diisocyanates having pendant polyoxyethylene chains (such as those described in the prior art, for example in U.S. Pat. No. 3920598). These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol mono-ether, the initially formed urethane monoisocyanate then reacting at a higher temperature with the excess diisocyanate to form an allophanate diisocyanate having a pendent polyoxyethylene chain. Suitable diisocyanates and polyethylene glycol monoethers for use in preparing the dispersing diisocyanate have been mentioned above for the preparation of the dispersing diols.

The polyurethane prepolymer (and final polymer) may of course have a combination of ionic dispersing groups (such as those discussed above) and non-ionic dispersing groups (such as those discussed above) which may be introduced into the polyurethane by combining the expedients as exemplified above for the incorporation of such groups.

The pendant dispersing group content of the polyurethane (if present) may vary within wide limits but should be sufficient to provide the prepolymer with the required degree of water-dispersability. Typically the pendant dispersing group content will vary in the range 10 to 90 milliequivalents (more preferably 18 to 65 milliequivalents) of pendant ionic dispersing groups (particularly carboxylate groups) per 100 g polyurethane polymer and/or 0.5 to 25 g of pendant nonionic dispersing groups (particularly polyethylene oxide groups) per 100 g polyurethane polymer.

The at least one polyisocyanate (i) used in making the prepolymer may be an aliphatic, cycloaliphatic, araliphatic or aromatic polyisocyanate. Examples of suitable polyisocyanates include ethylene diisocyante, 1,6-hexamethylene diisocyanate, isophorone diisocyanate, cyclohexane-1,4-diisocyanate, 4,4'-dicyclohexylmethane diisocyanate, p-xylylene diisocyanate, tetramethylxylene diisocyante, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

The at least one organic compound (ii) having at least two isocyanate-reactive groups used in the preparation of the prepolymer will usually include at least one such compound which has a weight average molecular weight in the range 400-6000. Such compounds are preferably polymeric organic polyols terminated by hydroxyl groups (although it would be possible to use polymeric compounds with other isocyanate-reactive groups, eg primary amino or carboxyl groups). The organic polyols particularly include diols and triols and mixtures thereof but higher functionality polyols may be used, for examples as minor components in admixture with diols. The polyols may be members of any of the chemical classes of polymeric polyols used or proposed for use in polyurethane formulations. In particular the polyols may be polyesters, polyesteramides, polyethers, polythioethers, polycarbonates, polyacetals, polyolefins or polysiloxanes. Preferred polyol molecular weights are from 700 to 3000.

Polyester polyols which may be used include hydroxyl terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxide to polyfunctional initiators, for example water, ethylene glycol, propylene glycol, diethylene glycol, cyclohexane dimethanol, glycerol, trimethylolpropane, pentaerylthritol or Bisphenol A. Especially useful polyethers include polyoxypropylene diols and (at low levels) triols, poly(oxyethylene-oxypropylene) diols and (at low levels) triols obtained by the simultaneous or sequential addition of ethylene and propylene oxides to appropriate initiators and polytetramethylene ether glycols obtained by the polymerisation of tetrahydrofuran. Amine-terminated polyetherpolyols may also be used.

Polythiother polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl or dialkyl carbonates, for example diphenyl carbonate or diethyl carbonate, or with phosgene.

Suitable polyolefine polyols include hydroxy-terminated butadiene homo- and copolymers.

The at least one organic compound (ii) having at least two isocyanate-reactive reactive groups (used in the preparation of the prepolymer) may also optionally include at least one compound, preferably an organic polyol, having molecular weight below 400. These particularly include diols and triols and mixtures thereof but higher functionality polyols may be used. Examples of such lower molecular weight polyols include ethylene glycol, diethylene glycol, tetraethylene glycol, bis(hydroxyethyl)terephthalate, cyclohexane dimethanol, furan dimethanol, and the reaction products, up to molecular weight 399, of such polyols with propylene oxide and/or ethylene oxide.

The isocyanate-terminated polyurethane prepolymer may be prepared in conventional manner by reacting a stoichiometric excess of the organic polyisocyanate with the polymeric organic compound(s) having at least two (terminal) isocyanate-reactive groups (usually hydroxyl) and the other required reactants under substantially anhydrous conditions at an appropriate temperature depending on the particular reactants (usually between 30° and 130° C.) until reaction between the isocyanate groups and the isocyanate-reactive (usually hydroxyl) groups is substantially complete. During the production of the isocyanate-terminated prepolymer the reactants are generally used in proportions corresponding to a ratio of isocyanate groups to isocyanate-reactive (usually hydroxyl) groups of from about 1.1:1 to about 6:1, preferably from about 1.5:1 to 3:1.

If desired, catalysts (such as dibutyltin dilaurate and stannous octoate may be used to assist prepolymer formation. A non-reactive organic solvent may optionally be (but is usually) added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

[It is evident from the foregoing that the term "polyurethane" as used in this specification is intended to apply not only to polymers (or prepolymers) made by reacting only polyisocyanates and polyols to give urethane linkages, but also to polymers (or prepolymers) made by reacting polyisocyanates with other types of compound, usually in conjunction with polyols, having other types of isocyanate-reactive groups, thereby to give polymers, prepolymers or polymer segments comprising other types of linkages, for example urea, thiourea, or amide linkages.]

Aqueous prepolymer dispersions may, as discussed supra, be prepared by dispersing the isocyanate-terminated polyurethane prepolymer (as an organic liquid medium, usually including an organic solvent) in an aqueous medium (using eg surfactants, or more preferably by utilising the self-dispersability of the prepolymer if dispersing groups are present therein, although surfactants may still be employed if desired). The prepolymer may be dispersed in water using techniques well known in the art. Preferably, the prepolymer is added to the water with agitation or, alternatively, water may be stirred into the prepolymer.

The chain extension performed in step 2) is conveniently conducted at temperatures in the range of 5° to 95° C., more usually 10° to 45° C., depending on the reactants being used.

The polymer solids content of the resulting dispersions will typically be from 20 to 60% by weight (25 to 50% by weight).

As discussed supra, the polyurethanes of the present invention are usefully employed as organic (or more preferably) as aqueous dispersions. Such dispersions may be used "as is" (apart from optional dilution with water and/or organic liquid or concentration by evaporation of water and/or organic liquid) in various applications or (more usually) may be used as a component of organic-based or (more usually) aqueous-based compositions incorporating other additional components, for example coreactant materials (appropriate to the Y groups) which will take part in (or assist with) a reaction involving the Y groups under certain conditions —as for example when the composition is a coating composition and the coreactant takes part in (or assists) a reaction involving the Y groups such as crosslinking during and/or after film formation from the composition (when the dispersing medium is being or has been removed).

The group(s) Y incorporated into the polyurethane polymer will impart to the polyurethane utility in various applications or situations appropriate to the nature of the group(s).

For example, where Y is a pendant carbonyl group, the polyurethane polymer may usefully be employed for crosslinking purposes, eg as a component of a coating composition (preferably aqueous-based) which is crosslinkable during and/or after film formation by virtue of a polyamine or polyhydrazide (or polyhydrazone) coreactant compound which is also included in the composition. Examples of suitable polyamine compounds include non-polymeric polyamine compounds such as ethylene diamine, propylene diamine, butylene diamine, 1,6 hexane diamine, 1,12-dodecane diamine, cyclohexylene diamine, piperazine, 2-methyl piperazine, phenylene diamine, tolylene diamine, xylylene diamine, 4,4'-diaminodiphenylmethane, menthane diamine, and m-xylene diamine. The polyamino coreactant compound could also eg be a polymer, such as an acrylic polymer, bearing amine functional groups.

Examples of suitable polyhydrazide (or derived polyhydrazone) compounds include dicarboxylic acid bishydrazides, such as those of formula:

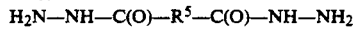

and dicarboxylic acid bis-hydrazones, such as those of formula:

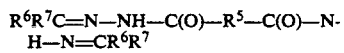

wherein $R^5$ is a covalent bond or a polyalkylene (preferably polymethylene) or alicyclic group having from 1 to 34 carbon atoms or a divalent aromatic ring, and $R^6$ and $R^7$ are selected from the group consisting of H and (C1 to C6) alkyl and alicyclic groups. Examples of suitable dihydrazides includes oxalic acid dihydrazide, malonic acid dihydrazide, succinic acid dihydrazide, glutaric acid dihyrazide, adipic acid dihydrazide, cyclohexane dicarboxylic acid bis-hydrazide, azelaic acid bis-hydrazide, and sebacic acid dihydrazide. If a composition does contain a polyhydrazide (or hydrazone) compound it may optionally contain 0.0002 to 0.02 mole per mole of hydrazide (or hydrazone) groups of a heavy metal ion. This may be added in the form of suitable water-soluble metal salts, particularly chlorides, sulphates, and acetates. Suitable metal salts are, in particular, those of Cu, Zn, Fe, Cr, Mn, Pb, V, Co and Ni.

Examples of polymers bearing amine functional groups (as the polyamino coreactant material) are olefinic addition polymers (ie polymers derived by the free-radical addition polymerisation of at least one olefinically unsaturated monomer) bearing chain-pendant (lateral) amino groups. Such a polymer may be made by first preparing an olefinic addition polymer bearing chain-pendant (lateral) carboxyl groups (precursor polymer), and then converting at least a proportion of the lateral carboxyl groups of the precursor polymer to groups providing lateral amino groups.

A precursor olefinic addition polymer bearing lateral carboxyl groups is conveniently prepared by polymerising at least one olefinically unsaturated monomer bearing at least one carboxyl group and optionally (but normally) at least one other olefinically unsaturated monomer (ie not bearing a carboxyl group).

Monomers which can be used to provide carboxyl groups in precursor polymers are particularly α, β-monoolefinically unsaturated monocarboxylic acids and/or dicarboxylic acids, mostly of 3 to 6 carbon atoms, especially acrylic acid, methacrylic acid, beta-carboxyethylacrylate, fumaric acid and itaconic acid.

Examples of olefinically unsaturated monomers not providing carboxyl functional groups which may be mentioned include 1,3-butadiene, isoprene, styrene, divinyl benzene, acrylonitrile, methacrylonitrile, vinyl halides (such as vinyl chloride), vinyl esters (such as vinyl acetate, vinyl propionate and vinyl laurate), heterocyclic vinyl compounds, alkyl esters of monolefinicaly unsaturated dicarboxylic acids (such as di-n-butyl maleate and di-n-butyl fumarate) and, in particular, esters, of acrylic acid and methacrylic acid of formula

$CH_2=CR^8COOR^9$ where $R^8$ is H or methyl and $R^9$ is alkyl or cycloalkyl of 1 to 20 carbon atoms (more preferably 1 to 8 carbon atoms) examples of which are methyl acrylate, methyl methacrylate, ethyl acrylate, ethyl methacrylate, hydroxyethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate and n-propyl methacrylate.

The chain pendant carboxyl groups of a precursor olefinic addition polymer may, for example, conveniently be converted to the lateral amino groups of the final polymer by means of an immination reaction involving the carboxyl (or derived carboxylate salt) group and an added aziridine compound. The aziridine compound is commonly referred to an alkylene imine and preferably has the formula

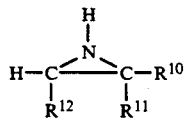

where $R^{10}$ and $R^{11}$ which maybe the same or different are selected from hydrogen, benzyl, aryl, and C1 to C5 alkyl; and where $R^{12}$ is hydrogen C1 to C5 alkyl. More preferably $R^{10}$ is hydrogen, $R^{11}$ is hydrogen or C1 to C5 alkyl (particularly methyl) and $R^{12}$ is hydrogen. Ethylene imine ($R^{10}=R^{11}=R^{12}=H$) and propylene imine ($R^{10}=R^{12}=H;R^{11}=$methyl) are particularly preferred aziridines because of their relatively low cost and ready availability. The corresponding chain pendant amino ester groups (providing chain pendant amino ester groups) formed by the immination reaction can be represented in the following schematic formulae:

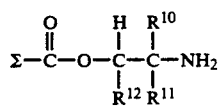

or

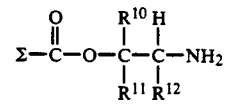

and possibly

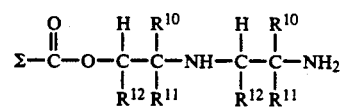

(the latter being formed by further reaction of some of the pendant primary amine groups with the aziridine) where $R^{10}$ $R^{11}$ and $R^{12}$ are as defined above.

The amount of alkylene imine used should be sufficient to imminate the desired proportion of the carboxyl groups to aminoalkyl ester groups. Preferably the amount used should be sufficient to imminate about 5% to 95%, preferably 20% to 80% (more preferably 34–70%), of the carboxyl groups on the preprecursor polymer. The immination technique is in itself well-known and may be performed by techniques known to the art.

Useful coreactant polyamino olefinic polymers for the compositions of present invention are imminated acrylic polymers (ie having at least a proportion, usually a high level, of acrylic or methacrylic ester units as defined above as well as imminised units providing lateral amino groups).

The chain-pendant amine functionality could of course be introduced into an olefinic addition polymer by techniques other than immination (eg by using as a monomer an olefinically unsaturated oxazoline monomer, such as 2-isopropenyl oxazoline followed by hydrolysis of the oxazoline groups to aminoalkyl ester groups).

Where Y is a pendant -SH group, the polyurethane may likewise be employed for crosslinking purposes, eg as a component of a coating composition (preferably aqueous-based) which is selfcrosslinkable during and/or after film formation by virtue of a forming disulphide links on air oxidation (so there is no need for a coreactant material, although crosslinking could be speeded up by using a mild oxidising catalyst).

Where Y is an olefinic double bond, the polyurethane may also be used for crosslinking purposes eg as a component of a coating composition (preferably aqueous-based) which is cross-linkable during and/or after film formation. For example, if the olefinic double bond is that of a (meth)acrylate group, the polyurethane can be crosslinked by exposure to ultraviolet radiation in the presence of a suitable photoinitiator, or by exposure to electron beam radiation, or by thermal curing using eg a peroxy curing agent. If, for example, the olefinic double bond is that of a (meth)allyl group, the polyurethane film can be crosslinked by air oxidation in the presence of suitable metal drier salts (autoxidation).

Siloxane and epoxide groups are other types of groups which can be employed for crosslinking purposes.

Where Y is a non-ionic dispersing group, the polyurethane has increased utility in aqueous-based compositions (particularly coating compositions) by virtue of having enhanced stability.

Where Y is an in-chain or lateral polymeric chain group, such as an in-chain or lateral polyester chain, this will yield novel polyurethane/polyester (or other polymer type) block copolymers.

It is of course possible for a final polyurethane polymer to possess groups Y which are of 2 or more different types, rather than being all of the same type.

A polyurethane polymer according to the invention will usually contain 0.1 to 1000 millimole of groups Y per 100 g of polymer, more usually 5 to 100 millimole per 100 g of polymer, although the particular proportion of Y groups will naturally be selected with their nature and the intended application of the polyurethane in mind.

Where the polyurethane is used in a composition which incorporates a coreactant material (eg for crosslinking), the level of such a material is often that to provide a range 0.25 to 4 moles (0.5 to 2.0 moles, especially 0.5 to 1.5 moles) of the relevant functional groups of the coreactant per mole of Y groups present in the polyurethane polymer composition. The groups Y may all (or substantially all) be bound to polyurethane polymer although the composition may also contain a certain quantity of "free" Y groups (ie not bound to the polyurethane; this occurs if not all the enolic compound has reacted in the chain extension step 2) and is still present in the system when the coreactant compound is incorporated). This latter situation often appears to do no harm to the effectiveness of the composition.

As discussed supra, the polyurethane polymers of the invention are particularly useful as components of coating compositions (eg protective or adhesive coating compositions), and especially aqueous-based coating compositions. Such compositions may eg provide film coatings (using an appropriate polyurethane) of improved properties such as film hardness, solvent resistance, corrosion resistance, or decreased water permeability.

Such coating compositions may be applied to a variety of substrates including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently as appropriate or desired. It is possible to include an amount of antimony oxide in the dispersions to enhance the fire retardant properties.

Such compositions could, if desired and if appropriate, include other polymer dispersions (ie polymers other than polyurethane polymer bearing Y groups), for example polyvinyl acetate, polyethylene, polystyrene, polybutadiene, polyvinyl chloride polyacrylate, other types of polyurethanes, polyesters, polyimides, polyepoxides, and other homopolymer and copolymer dispersions. These can sometimes be prepared in-situ (eg by polymerisation of the monomers in the presence of the polyurethane polymer).

The present invention is now further illustrated by reference to the following examples. Unless otherwise specified all parts and percentages are on a weight basis. Examples 1 to 19 are concerned with the preparation or use of polyurethanes according to the invention in which the terminal NCO groups of the prepolymer are converted to groups providing —$NH_2$ groups using hydrazine or polyamino reagents. Examples 20 to 37 are concerned with the preparation or use of polyurethanes according to the invention in which the NCO groups of the prepolymer are converted to —$NH_2$ groups using only water as the isocyanate-reactive reagent for stage 1.

In these examples, the double rub test assesses the solvent resistance of a film which has been derived from a composition by drying at room temperature or an elevated temperature (see tables) and is effected by rubbing the film (at room temperature) with a rag soaked with the solvent until the film fails (ie is showing through) or until 200 double rubs is achieved before failure, when the film is rated as follows:

200 (0/5) : film failed
200 (1/5) : film is severely affected
200 (2/5) : film is affected
200 (3/5) : film is slightly affected
200 (4/5) : film is hardly affected
200 (5/5) : film is unaffected In these examples, the spot test also assesses the solvent resistance of a film and is determined as follows. A specimen of laminated mahogany veneered chipboard is painted with the sample and left to dry at 52° C. for 24 hours. Pieces of cotton wool, soaked in the solvent to be applied, are placed on the coated wood. These are each covered by a small inverted bottle. The solvent-soaked cotton wool pieces are left for 15 mins; they are then removed, and the film patted dry; the area of film in contact with the solvent is then assessed out of 5 (0/5-poor, no film left; 5/5-excellent, cannot see where solvent has been).

EXAMPLES 1 and 2

A polyurethane polymer having pendant ketonic carbonyl groups (Example 1) was prepared as follows.

A polyurethane prepolymer solution was prepared from the following ingredients.

|  | Parts |
| --- | --- |
| Isophorone diisocyanate | 39.6 |
| Dimethylol propionic acid | 5.8 |
| Polytetrahydrofuran diol | 54.6 |
| N-methyl pyrrolidone | 44.6 |
| Dibutyl tin dilaurate | 0.14 |

The prepolymer contained 3.66% NCO groups (theoretical 4.04%)

The prepolymer solution was then neutralised with 4.4 parts of triethylamine and dispersed in 140 parts of distilled water containing 4.8 parts of hydrazine hydrate (ie 1.5 stoichiometric equivalents of hydrazine with respect to NCO groups having been used). After about half an hour 15.8 parts of trimethylol propane triacetoacetate were added portion wise to the stirred pre dispersion to give the keto functional polyurethane of Example 1 as an aqueous dispersion with a solids content of 36 w/w% (the ratio of terminal semicarbazide —$NH_2$ groups to keto groups for this reaction being about ½; the molar ratio of semicarbazide —$NH_2$ groups to trikoester being 1/0.62). The level of pendant ketonic carbonyl functionality on the polyurethane polymer is 0.517 mmolesg$^{-1}$ of polymer.

When 100 parts of this dispersion were treated with 1.6 parts of adipic acid dihydrazide (as a 5% aqueous solution) the films formed from the resulting crosslinkable composition (Example 2) on glass plates exhibited an increase in ethanol double rub resistance (at room temperature) of from 30 to at least 200 (3) rubs, an increase in methyl ethyl ketone (MEK) double rub resistance (room temperature) of from 20 to 187 double rubs, and an increase in Konig hardness of from 30 rocks to 80 rocks, the lower values being those obtained using the same tests (under the same conditions) on films formed from the dispersion without any dihydrazide therein.

EXAMPLE 3

A polyurethane polymer having pendant ketonic carbonyl groups (Example 3) was prepared as follows.

A polyurethane prepolymer solution was prepared from the following ingredients.

| | Parts |
|---|---|
| Isophorone diisocyanate | 39.60 |
| Polytetrahydrofuran diol | 54.60 |
| Dimethylol propionic acid | 5.80 |
| N-methylpyrrolidone | 44.60 |
| Dibutyl tin dilaurate | 0.14 |

The prepolymer contained 3.66 w/w% NCO groups (theoretical 4.04%).

The temperature of the pre-polymer was adjusted to between 60°–70° C. and was then neutralised with 4.4 parts of triethylamine. The neutralised prepolymer was maintained at 60°–70° C. and was dispersed in 150 parts distilled water containing 4.8 parts hydrazine (ie 1.5 stoichiometric equivalents of hydrazine with respect to NCO groups having been used). After about half an hour 28.5 parts of trimethyol propane triacetoacetate (22.74 w/w% based on solid polymer) were added portionwise to the stirred pre-dispersion to give the keto functional polyurethane of Example 3 as an aqueous dispersion with a solids content of 39 w/w%. The ratio of terminal semicarbazide —$NH_2$ groups to keto groups for this reaction being about 1/3; the molar ratio of semicarbazide —$NH_2$ groups to triketoester is 1/1.12). The level of pendant ketonic carbonyl functionality on the polyurethane polymer is 1.20 mmols $g^{-1}$ of polymer.

EXAMPLE 4

A polyurethane polymer having pendant ketonic carbonyl groups (Example 4) was prepared as follows.

A polyurethene prepolymer solution was prepared from the following ingredients.

| | Parts |
|---|---|
| Isophorone diisocyanate | 39.60 |
| Polytetrahydrofuran diol | 54.60 |
| Dimethylol propionic acid | 5.80 |
| N-methylpyrrolidone | 44.60 |
| Dibutyl tin dilaurate | 0.14 |

The prepolymer contained 3.66 w/w% NCO groups (theoretical 4.04%).

The temperature of the pre-polymer wa adjusted to between 60°–70° C. and was then neutralised with 4.4 parts of triethylamine. The neutralised prepolymer was maintained at 60°–70° C. and was dispersed in 150 parts distilled water containing 3.9 parts hydrazine (ie 1.24 stoichiometric equivalents of hydrazine with respect to NCO groups). After about half an hour 18.6 parts of trimethylol propane triacetoacetate (17.47 w/w% based on solid polymer) were added portionwise to the stirred pre-dispersion to give the keto-functional polyurethane of Example 4 as an aqueous dispersion with a solids content of 37 w/w%. (The ratio of terminal semicarbazide —$NH_2$ groups to keto groups for this reaction being about 1/4.8; the molar ratio of semicarbazide -$NH_2$ groups to triketoester is 1/1.60). The level of pendant ketonic carbonyl functionality on the polyurethane polymer is 0.963 mmol $g^{-1}$ polymer

EXAMPLE 5

A polyurethane polymer having pendant ketonic carbonyl groups (Example 5) was prepared as follows.

A polyurethane prepolymer solution was prepared from the following ingredients.

| | Parts |
|---|---|
| Isophorone diisocyanate | 39.60 |
| Polytetrahydrofuran diol | 54.60 |
| Dimethylol propionic acid | 5.80 |
| N-methylpyrrolidone | 44.60 |
| Dibutyl tin dilaurate | 0.14 |

The prepolymer contained 3.49 w/w% NCO groups (theoretical 4.04%).

The temperature of the pre-polymer was adjusted to between 60°–70° C. and was then neutralised with 4.4 parts of triethylamine. The neutralised prepolymer was maintained at 60°–70° C. and was dispersed in 140 parts distilled water containing 3.2 parts hydrazine (ie 1.06 stoichiometric equivalents of hydrazine with respect to NCO groups having been used). After about half an hour 16.7 parts of trimethylol propane triacetoacetate (16.05 w/w% based on solid polymer) were added portionwise to the stirred pre-dispersion to give the keto functional polyurethane of Example 5 as an aqueous dispersion with a solids content of 35 w/w%. (The ratio of terminal semicarbazide-$NH_2$, groups to keto groups for this reaction being about 1/16.8; the molar ratio of semicarbazide —$NH_2$ groups to triketoester is 1/4.8). The level of pendant ketonic carbonyl functionality on the polyurethane polymer is 1.13 mmols $g^{-1}$.

EXAMPLES 6, 7 and 8

The aqueous dispersions of the polyurethane polymers prepared in Examples 3, 4 and 5 were mixed with adipic acid dihydrazide ADH (as a 5% aqueous solution) to give crosslinkable compositions Examples 6, 7 and 8 respectively. The levels of ADH used are shown in Table 1. Films were formed from the compositions on glass plates and tested for MEK and ethanol solvent resistance (double rub tests); the results are shown in Table 1.

TABLE 1

| Compn Ex. No. | Source of Polymer disp. | Amount ADH (parts per 100 pts disp.) | MEK resist. (double rubs) 52° C. | MEK resist. (double rubs) 110° C. | Ethanol resist. (double rubs) 52° C. | Ethanol resist. (double rubs) 110° C. |
|---|---|---|---|---|---|---|
| Control | Ex. 3 | none | 14 | 14 | 19 | 23 |
| 6 | Ex. 3 | 3.46 | 200(4) | 200(1) | 200(4) | 200(4) |

TABLE 1-continued

| Compn Ex. No. | Source of Polymer disp. | Amount ADH (parts per 100 pts disp.) | MEK resist. (double rubs) 52° C. | MEK resist. (double rubs) 110° C. | Ethanol resist. (double rubs) 52° C. | Ethanol resist. (double rubs) 110° C. |
|---|---|---|---|---|---|---|
| Control 7 | Ex. 4 | none | 15 | 11 | 22 | 20 |
| 7 | Ex. 4 | 2.23 | 200(4) | 200(4) | 200(3) | 200(5) |
| Control 8 | Ex. 5 | none | 25 | 21 | 31 | 15 |
| 8 | Ex. 5 | 2.13 | 200(4) | 200(5) | 200(5) | 200(5) |

EXAMPLE 9

A polyurethane polymer having pendant ketonic carbonyl groups (Example 9) was prepared as follows.

A polyurethene prepolymer solution was prepared from the following ingredients.

|  | Parts |
|---|---|
| Isophorone diisocyanate | 84.59 |
| Oxyflex S-1063-120 (Polyester diol) | 81.86 |
| Dimethylol propionic acid | 8.84 |
| 1,4-Cyclohexanedimethanol | 5.16 |
| N-methyl pyrrolidone | 47.46 |
| Dibutyl tin dilaurate | 0.30 |

The prepolymer contained 7.33 w/w% NCO groups (theoretical 7.5 w/w%)

The temperature of the pre-polymer was adjusted to between 60°-70° C. and was then neutralised with 7.01 parts of triethylamine. The neutralised prepolymer was maintained at 60°-70° C. and was dispersed in 320 parts distilled water containing 11.53 parts hydrazine (ie 1.2 stoichiometric equivalents of hydrazine with respect to NCO groups being used). After about half an hour 47.3 parts of trimethylol propane triacetoacetate (21.40 w/w% based on solid prepolymer) were added portionwise to the stirred pre dispersion to give the keto functional polyurethane of Example 9 as an aqueous dispersion with a solids content of 38 w/w%. The ratio of terminal semicarbazide—$NH_2$ groups to keto groups for this reaction was about 1/5; the molar ratio of semicarbazide —$NH_2$ groups to triketoester is 1/1.66. The level of pendant ketonic carbonyl functionality on the polyurethane polymer is 1.370 mmols $g^{-1}$ of polymer.

EXAMPLES 10, 11, 12, 13, 14

The aqueous dispersion of the polyurethane polymer prepared in Example 9 was mixed with varying amounts of an acrylic polymer latex bearing amine functional groups to give crosslinkable compositions Examples 10, 11, 12, 13 and 14 respectively. The amine-functional polymer used was itself made by immination (using propylene imine) of a precursor acrylic polymer (in latex form) bearing carboxyl groups and it was estimated that about 40% of the carboxyl groups on the precursor polymer were converted to lateral primary amino groups; The levels of polyurethane and imminated acrylic polymer used are shown in Table 2.

Films were formed from the compositions and tested for solvent resistance using double rub tests (on glass plates) and spot tests (on wood); the results are shown in Table 2.

TABLE 2

| Compn Ex. No. | Ratio pu/acrylic (w/w solids) | MEK resist. (double rubs) Room temp | MEK resist. (double rubs) 52° C. | MEK resist. (double rubs) 110° C. | MEK resist. (spot test) | Ethanol resist. (spot test) |
|---|---|---|---|---|---|---|
| Control | 0/100 | 140 | 125 | 150 | 0.5 | 0.5 |
| 10 | 10/90 | 200(4) | 200(4) | 200(5) | 4.5 | 4.5 |
| 11 | 20/80 | 200(2) | 200(4) | 200(4) | 4.5 | 4.5 |
| 12 | 30/70 | 200(1) | 200(3) | 200(4) | 4.5 | 4.5 |
| 13 | 40/60 | 200(3) | 200(3) | 200(4) | 4.5 | 4.5 |
| 14 | 50/50 | 200(4) | 200(3) | 200(5) | 4 | 4 |
| Control | 100/0 | 26 | 15 | 11 | 2.5 | 2.5 |

EXAMPLES 15, 16, 17, 18, 19

The aqueous dispersion of the polyurethane polymer prepared in Example 4 was mixed with varying amounts of the same acrylic polymer latex bearing amine functional groups as used in Examples 6, 7 and 8, thereby to give crosslinkable compositions 15, 16, 17, 18 and 19. The levels of polyurethane and imminated acrylic polymer used are shown in Table 3. Films were formed from the composition and tested for solvent resistance using double rub tests (on glass plates) and spot tests (on wood); the results are shown in Table 3.

TABLE 3

| Compn Ex. No. | Ratio pu/acrylic (w/w solids) | MEK resist. (double rubs) 52° C. | MEK resist. (double rubs) 110° C. | MEK resist. (spot test) | Ethanol resist. (spot test) |
|---|---|---|---|---|---|
| Control | 0/100 | 125 | 150 | 0.5 | 0.5 |
| 15 | 10/90 | 156 | 195 | 4.5 | 4.5 |
| 16 | 20/80 | 199 | 200(1) | 4.5 | 4.5 |
| 17 | 30/70 | 200(1) | 200(4) | 5 | 5 |
| 18 | 40/60 | 200(4) | 200(4) | 4.5 | 4.5 |
| 19 | 50/50 | 200(4) | 200(4) | 4.5 | 4.5 |
| Control | 100/0 | 15 | 11 | 0 | 0 |

EXAMPLE 20

A polyurethane polymer having pendant ketonic carbonyl groups (Example 20) was prepared as follows.

A polyurethane prepolymer solution was prepared from the following ingredients.

|  | Parts |
|---|---|
| Isophorone diisocyanate | 39.60 |
| Polytetrahydrofuran diol | 54.60 |
| Dimethylol propionic acid | 5.80 |
| N-methyl pyrrolidone | 44.60 |
| Dibutyl tin dilaurate | 0.14 |

The prepolymer contained 3.95 w/w% NCO (theoretical 4.04%).

The temperature of the pre-polymer was adjusted to between 60°-70° C. and was then neuralised with 4.4 parts of triethylamine. The neutralised prepolymer was maintained at 60°-70° C. and was dispersed in 150 parts distilled water containing 17.7 parts of trimethylol propane triacetoacetate (16.56 w/w% based on solid polymer). After the dispersion had been completed it was stirred for a further 2 hours. The keto functional polyurethane dispersion had solids content of 36 w/w%.

If all the NCO groups were to be converted to amine groups the $NH_2$/keto ratio would be about 1/1.01.

EXAMPLE 21

A polyurethane polymer having pendant ketonic carbonyl groups (Example 21 was prepared as follows.

A polyurethene prepolymer solution was prepared from the following ingredients.

|  | Parts |
| --- | --- |
| Isophorone diisocyanate | 39.60 |
| Polytetrahydrofuran diol | 54.60 |
| Dimethylol propionic acid | 5.80 |
| N-methyl pyrrolidone | 44.60 |
| Dibutyl tin dilaurate | 0.14 |

The prepolymer contained 3.90w/w% NCO groups (theoretical 4.04%).

The temperature of the pre-polymer was adjusted to between 60°-70° C. and was then neutralised with 4.4 parts of triethylamine. The neutralised prepolymer was maintained at 60°-70° C. and was dispersed in 150 parts distilled water containing 17.6 parts of trimethylol propane triacetoacetate (16.36 w/w % based on solid polymer). After the dispersion had been completed it was stirred for a further 2 hours. The keto functional polyurethane dispersion had a solids content of 36 w/w%. If all the NCO groups groups were to be converted to amine groups the $NH_2$/keto ratio would be about 1/1.02.

EXAMPLE 22

A polyurethane polymer having pendant ketonic carbonyl groups (Example 22) was prepared as follows.

A polyurethane prepolymer solution was prepared from the following ingedients.

|  | Parts |
| --- | --- |
| Isophorone diisocyanate | 39.60 |
| Polytetrahydrofuran diol | 54.60 |
| Dimethylol propionic acid | 5.80 |
| N-methylpyrrolidone | 44.60 |
| Dibutyl tin dilaurate | 0.14 |

The prepolymer contained 3.95 w/w% NCO groups (theoretical 4.04%).

The temperature of the pre-polymer was adjusted to between 60°-70° C. and was then neutralised with 4.4 parts of triethylamine. The neutralised prepolymer was maintained at 60°-70° C. and was dispersed in 140 parts distilled water containing 12.4 parts of trimethyol propane triacetoacetate (12.15 w/w % based on solid polymer). After the dispersion had been completed it was stirred for a further 2 hours. The keto functional polyurethane dispersion had a solids content of 36 w/w%. If all the NCO groups were to be converted to amine groups the $NH_2$/keto ratio would be about 1/0.72.

EXAMPLE 23

A polyurethane polymer having pendant ketonic carbonyl groups (Example 23) was prepared as follows.

A polyurethene prepolymer solution was prepared from the following ingredients.

|  | Parts |
| --- | --- |
| Isophorone diisocyanate | 82.63 |
| Oxyflex S-1063-120 (Polyester diol) | 82.97 |
| Dimethylol propionic acid | 8.84 |
| 1,4-Cyclohexanedimethanol | 5.17 |
| N-methyl pyrrolidone | 47.46 |
| Dibutyl tin dilaurate | 0.30 |

The prepolymer contained 6.37 w/w% NCO groups (theoretical 6.85 w/w%)

The temperature of the pre-polymer was adjusted to between 60°-70° C. and was then neutralised with 6.9 parts of triethylamine. The neutralised prepolymer was maintained at 60°-70° C. and was dispersed in 310 parts distilled water containing 22.5 parts of trimethylol propane triacetoacetate. After the dispersion had been completed it was stirred for a further 2 hours. The keto functional polyurethane dispersion had a solids content 33.5 w/w%. If all the NCO groups were to be converted to amine groups the $NH_2$/keto ratio would be about 1/0.51.

EXAMPLE 24 to 31

The aqueous dispersions of the polyurethane polymers prepared in Examples 20,21,22 and 23 were mixed with various levels of adipic acid dihydrazide ADH (as a 5% solution) to give crosslinkable compositions. Examples 24 to 31 respectively. The levels of ADH used are shown in Table 4. Films were formed from the compositions on glass plates and tested for solvent resistance (double rub test); the results are shown in Table 4.

EXAMPLES 32,33,34

The aqueous dispersion of the polyurethane polymer prepared in Example 22 was mixed with varying amounts of an acrylic polymer latex bearing amine functional groups to give crosslinkable compositions Examples 32, 33 and 34 respectively. The amine-functional polymer polymer used was itself made by immination (using propylene imine) of a precursor acrylic polymer (in latex form) bearing carboxyl groups and it was estimated that about 40% of the carboxyl groups on the precursor polymer were converted to lateral primary amine groups. The levels of polyurethane and imminated acrylic polymer used are shown in Table 5. Films were formed from the composition and tested for solvent resistance using double rub (on glass plates) and spot tests (on wood); the results are in Table 5.

EXAMPLES 35,36 and 37

The aqueous dispersion of the polyurethane polymer prepared in Example 23 was mixed with varying amounts of the same amine-functional acrylic polymer as used in Examples 32, 33 and 34, thereby to give crosslinkable compositions Examples 35, 36 and 37. The levels of polyurethane and imminated acrylic polymer used are showm in Table 6. Films were formed from the composition and tested for solvent resistance using double rub (on glass plates) and spot tests (on wood); the results are shown in Table 6.

TABLE 4

| Compn Ex. No. | Source of Pu disp. | Amount ADH (parts per 100 pts disp.) | MEK resist. (double rubs) Rm temp | MEK resist. (double rubs) 52° C. | Ethanol resist. (double rubs) Rm temp | Ethanol resist. (double rubs) 52° C. |
| --- | --- | --- | --- | --- | --- | --- |
| Control | Ex. 20 | none | 11 | 12 | 14 | 19 |
| 24 | Ex. 20 | 2.93 | 200(3) | 190 | 200(4) | 200(5) |
| 25 | Ex. 20 | 4.18 | 200(4) | 200(4) | 200(4) | 200(4) |
| Control | Ex. 21 | none | 10 | 15 | 19 | 21 |
| 26 | Ex. 21 | 2.86 | 147* | 178* | 200(4) | 200(5) |
| 27 | Ex. 21 | 4.09 | 200(4) | 200(2) | 200(2) | 200(4) |
| Control | Ex. 22 | none | 15 | 30 | 87 | 61 |
| 28 | Ex. 22 | 2.14 | 200(4) | 200(4) | 200(4) | 200(3) |
| Control | Ex. 23 | none | 24 | 131 | 15 | 25 |
| 29 | Ex. 23 | 1.20 | 188* | 153* | 200(5) | 200(3) |
| 30 | Ex. 23 | 2.10 | 200(5) | 200(5) | 200(5) | 200(4) |
| 31 | Ex. 23 | 3.01 | 200(5) | 200(5) | 200(3) | 200(3) |

*Adhesive failure, not failure of film itself.

TABLE 5

| Compn Ex. No. | Ratio pu/acrylic (w/w solids) | MEK resist. (double rubs) Rm temp | MEK resist. (double rubs) 52° C. | MEK resist. (double rubs) 110° C. | MEK resist. (spot test) | Ethanol resist. (spot test) |
| --- | --- | --- | --- | --- | --- | --- |
| Control | 0/100 | 125 | 150 | — | 0.5 | 0.5 |
| 32 | 10/90 | 200(3) | 200(3) | 200(3) | 4 | 4.5 |
| 33 | 20/80 | 198* | 180* | 200(3) | 4 | 4.5 |
| 34 | 30/70 | 172* | 199* | 200(3) | 3.5 | 4.5 |
| Control | 100/0 | 15 | 30 | 87 | 0 | 0 |

*Adhesive failure, not failure of film itself.

TABLE 6

| Compn Ex. No. | Ratio pu/acrylic (w/w solids) | MEK resist. (double rubs) Rm temp | MEK resist. (double rubs) 52° C. | MEK resist. (Spot test) | Ethanol resist. (Spot test) |
| --- | --- | --- | --- | --- | --- |
| Control | 0/100 | 125 | 150 | 0.5 | 0.5 |
| 35 | 10/90 | 200(5) | 199* | 4 | 4.5 |
| 36 | 20/80 | 155* | 189* | 4 | 4.5 |
| 37 | 30/70 | 198* | 153* | 4 | 4.5 |
| Control | 100/0 | 24 | 31 | 0 | 0 |

*Adhesive failure, not failure of film itself.

What is claimed:

1. Process for the production of a polyurethane polymer having desired chain-pendant or in-chain groups, denoted by Y, which process comprises:
   1) converting terminal isocyanate groups of an isocyanate-terminated polyurethane prepolymer to groups providing carbon- or nitrogen-bound —$NH_2$ and/or —NH—groups which are reactable with enolic carbonyl groups, thereby to form a modified prepolymer, and
   2) chain-extending modified prepolymer formed in 1) with at least one compound which has at least two independently reactable enolic carbonyl groups, which compound also has at least one group Y which becomes chain-pendant or in-chain in the chain-extended polymer, and wherein by an enolic carbonyl group is meant a carbonyl group having enolic character by virtue of being bonded to an alpha methylene or methine group which is itself bonded alpha to an electron withdrawing group.

2. Process according to claim 1 wherein the electron withdrawing group is an acid ester group, an acid amide group, an aryl group, or a ketonic carbonyl group.

3. Process according to either claim 1 or claim 2 wherein the enolic carbonyl group is provided as part of a larger grouping selected from those of formulae

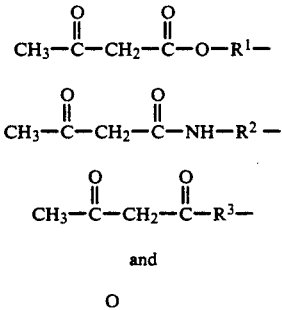

and where $R^1$, $R^2$ and $R^3$ are optionally substituted hydrocarbyl radicals, and Ar is an optionally substituted arylene group.

4. Process according to claim wherein Y is a crosslinking-assisting group, an adhesion-promoting group, a rheology modifying group, a stabiliser group, a corrosion inhibiting group, or a block copolymer-forming polymer chain group.

5. Process according to claim 1 wherein Y is selected from a ketonic or aldehydic carbonyl group, an olefinically unsaturated double bond, a thiol group, a nonionic dispersing group, a siloxane group, an epoxide group, a phosphonate or phosphate group, and a polymeric chain group.

6. Process according to claim 5 wherein Y is a ketonic or aldehydic carbonyl group that has been provided by having three or more independently reactable enolic carbonyl groups in the chain-extending compound used in step 2) so that those not taking part in the chain-extension reaction finish up as lateral carbonyl-containing groups in the chain-extended polymer.

7. Process according to claim 5 wherein Y is an olefinically unsaturated double bond provided by a group selected from acryloyl, methacryloyl, allyl, and methallyl groups, or substituted derivatives thereof.

8. Process according to claim 1 wherein in step 1) the terminal isocyanate groups of the prepolymer are converted to groups providing carbon - or nitrogen-bound —NH$_2$ and/or —NH—groups using an isocyanate-reactive reagent which is not water for substantially effecting this reaction.

9. Process according to claim 8 wherein said isocyanate-reactive reagent is selected from hydrazine or hydrazine hydrate, a substituted hydrazine, a hydrazide compound and a polyamino compound.

10. Process according to claim 1 where in step 1) the terminal isocyanate groups of the prepolymer are converted to —NH$_2$ groups using water as the sole isocyanate-reactive reagent.

11. Process according to claim 1 wherein the amount of compound bearing enolic carbonyl groups is such as to provide a ratio of carbon or nitrogen-bound —NH$_2$ or —NH—groups to enolic carbonyl groups within the range of from 1/20 to 1/0.1.

12. Process according to claim 1 wherein said process comprises:
   1a) forming an isocyanate-terminated polyurethane prepolymer in an organic liquid medium, and dispersing the isocyanate-terminated prepolymer in water to form an aqueous dispersion thereof,
   1b converting terminal isocyanate groups of the prepolymer to groups providing carbon- or nitrogen-bound —NH$_2$ and/or —NH—groups which are reactable with enolic carbonyl groups, thereby to form a modified prepolymer; and
   2) chain extending mofified prepolymer formed in 1b) with at least one compound which has at least two independently reactable enolic carbonyl groups, which compound also has at least one group Y which becomes chain-pendant or in-chain in the chain-extended polymer.

13. Process according to claim 1 wherein the polyurethane prepolymer has ionic and/or nonionic lateral dispersing groups so as to render it self-dispersible in water.

14. Process according to claim 1 wherein the resulting polyurethane polymer contains 0.1 to 1000 millimole of groups Y per 100 g of polymer.

15. A polyurethane polymer when prepared using a process according to claim 1.

16. A polyurethane polymer having desired chain-pendant or in-chain groups, denoted by Y, which polymer has been prepared by
   1) converting terminal isocyanate groups of an isocyanate-terminated polyurethane prepolymer to groups providing carbon- or nitrogen-bound —NH$_2$ and/or —NH—groups which are reactable with enolic carbonyl groups, thereby to form a modified prepolymer, and
   2) chain-extending modified prepolymer formed in 1) with at least one compound which has at least two independently reactable enolic carbonyl groups, which compound also has at least one group Y which becomes becomes chain-pendant or in-chain in the chain-extended polymer, and wherein by an enolic carbonyl group is meant a carbonyl group having enolic character by virtue of being bonded to an alpha methylene or methine group which is itself bonded alpha to an electron withdrawing group.

17. An aqueous-or organic-based dispersion of a polyurethane polymer according to claim 15.

18. An aqueous - or organic-based composition comprising a polyurethane polymer according to claim 15.

19. A composition according to claim 18 which is an aqeuous-based composition and comprises an aqueous dispersion of said polyurethane polymer.

20. Composition according to claim 18 wherein said composition is a coating composition.

21. Composition according to claim 20 wherein said Y groups take part in a crosslinking reaction during and/or after film formation from the composition.

22. Composition according to claim 21 wherein said Y groups are selected from ketonic or aldehydic carbonyl groups, olefinically unsaturated double bonds, thiol groups, siloxane groups, and epoxide groups.

23. Composition according to claim 21 wherein said composition includes a coreactant material, appropriate to the groups Y in the polyurethane polymer, which takes part in or assists the crosslinking reaction during and/or after film-formation.

24. Composition according to claim 23 wherein said coreactant material is a polyhydrazide compound a polyhydrazone compound, a polyamino compound, an oxidizing catalyst, a photoinitiator, a peroxy curing agent or a metal drier salt.

25. Composition according to claim 24 wherein the coreactant material is a dicarboxylic acid bishydrazide or a dicarboxylic acid bis-hydrazoen.

26. Composition according to claim 24 wherein the coreactant material is a non-polymeric polyamine compound.

27. Composition according to claim 24 wherein the coreactant material is a polymeric material bearing amine functional groups.

28. Composition according to claim 27 wherein said coreactant material is an olefinic addition polymer bearing lateral amine groups.

29. Composition according to claim 28 wherein said coreactant material is prepared by imminating an olefinic addition precursor polymer bearing carboxyl groups.

30. Composition according to claim 29 wherein the coreactant material is an imminate dacrylic polymer.

31. Composition according to claim 20 wherein said Y groups are selected from stabilising groups, phosphonate or phosphate groups, and polymer chain groups.

32. A film coating derived from a composition according to claim 20.

* * * * *